US012582940B2

(12) United States Patent
Bhuwania et al.

(10) Patent No.: US 12,582,940 B2
(45) Date of Patent: Mar. 24, 2026

---

(54) MEMBRANE PRECONCENTRATION OF CARBON DIOXIDE FROM EXHAUST GAS SOURCES

(71) Applicant: Chevron U.S.A. Inc., San Ramon, CA (US)

(72) Inventors: Nitesh Bhuwania, Richmond, CA (US); Daniel Chinn, Danville, CA (US); Raja Ankush Jadhav, Benicia, CA (US); Zihan Huang, Emeryville, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/642,583

(22) Filed: Apr. 22, 2024

(65) Prior Publication Data

US 2024/0350969 A1      Oct. 24, 2024

Related U.S. Application Data

(60) Provisional application No. 63/497,696, filed on Apr. 21, 2023.

(51) Int. Cl.
B01D 53/22 (2006.01)
B01D 71/06 (2006.01)

(52) U.S. Cl.
CPC ........... B01D 53/228 (2013.01); B01D 71/06 (2013.01); *B01D 2256/10* (2013.01);
(Continued)

(58) Field of Classification Search
CPC .... B01D 53/22; B01D 53/228; B01D 53/229; B01D 2256/10; B01D 2256/12; B01D 2257/504; B01D 2258/01; B01D 70/06
(Continued)

---

(56) References Cited

U.S. PATENT DOCUMENTS 6,648,944 B1    11/2003  Baker
7,266,940 B2    9/2007  Balan
(Continued)

FOREIGN PATENT DOCUMENTS

WO      2022074293 A1    4/2022
WO      2023181678 A1    9/2023
WO      2024014493 A1    1/2024

OTHER PUBLICATIONS

Aleksandra Janusz-Cygan et al., "The Separative Performance of Modules with Polymeric Membranes for a Hybrid Adsorptive/ Membrane Process of CO2 Capture from Flue Gas," Membranes 2020, 10, 309, https://doi.org/10.3390/membranes10110309.
(Continued)

*Primary Examiner* — Frank M Lawrence, Jr.
*Assistant Examiner* — Frank Lawrence
(74) *Attorney, Agent, or Firm* — Jason M. Guerrero

(57) ABSTRACT

A process of preconcentrating $CO_2$ in an exhaust gas stream includes flowing all the exhaust gas stream from an exhaust gas source to a $CO_2$ preconcentration system. Within the $CO_2$ preconcentration system, at least a portion of the exhaust gas stream is fed to a membrane separation module comprising a polymeric membrane that has a perm-selectivity for $CO_2$ over $N_2$ and $O_2$, to produce a $CO_2$ rich exhaust gas. The exhaust gas stream may initially have as low as 400 ppm $CO_2$ and may be preconcentrated to over 8 vol. % $CO_2$, thereby generating a more optimal feed for further treatment processes.

17 Claims, 7 Drawing Sheets

(52) U.S. Cl.
CPC .... *B01D 2256/12* (2013.01); *B01D 2257/504* (2013.01); *B01D 2258/01* (2013.01)

(58) Field of Classification Search
USPC ................................. 95/43, 45, 51; 96/4, 10
See application file for complete search history.

(56) References Cited

U.S. PATENT DOCUMENTS

| | | | |
|---|---|---|---|
| 7,634,915 B2 | 12/2009 | Hoffmann | |
| 7,637,093 B2 | 12/2009 | Rao | |
| 7,637,984 B2 | 12/2009 | Adamopoulos | |
| 7,654,320 B2 | 2/2010 | Payton | |
| 7,726,114 B2 | 6/2010 | Evulet | |
| 7,739,864 B2 | 6/2010 | Finkenrath | |
| 7,752,848 B2 | 7/2010 | Balan | |
| 7,802,434 B2 | 9/2010 | Varatharajan | |
| 7,827,778 B2 | 11/2010 | Finkenrath | |
| 7,895,822 B2 | 3/2011 | Hoffmann | |
| 7,966,829 B2 | 6/2011 | Finkenrath | |
| 8,012,446 B1 | 9/2011 | Wright | |
| 8,057,579 B2 | 11/2011 | Molaison | |
| 8,088,196 B2 | 1/2012 | White | |
| 8,104,259 B2 | 1/2012 | Joshi | |
| 8,114,191 B2 | 2/2012 | Rabiei | |
| 8,177,885 B2 | 5/2012 | Wijmans | |
| 8,246,718 B2 | 8/2012 | Wijmans | |
| 8,317,906 B2 | 11/2012 | Bansal | |
| 8,323,602 B2 | 12/2012 | Wright | |
| 8,398,743 B2 | 3/2013 | Molaison | |
| 8,419,828 B2 | 4/2013 | Diaz | |
| 8,535,638 B2 | 9/2013 | Terrien | |
| 8,551,226 B2 | 10/2013 | Lee | |
| 8,728,201 B2 | 5/2014 | Nazarko | |
| 8,911,535 B2 | 12/2014 | Kulkarni | |
| 8,980,211 B2 | 3/2015 | Timmins | |
| 9,140,186 B2 | 9/2015 | Wei | |
| 9,371,755 B2 | 6/2016 | Hamad | |
| 9,409,120 B2 | 8/2016 | Liu | |
| 9,433,887 B2 | 9/2016 | Wijmans | |
| 9,452,385 B1 | 9/2016 | Kulkarni | |
| 9,452,386 B1 | 9/2016 | Kulkarni | |
| 9,546,785 B1 | 1/2017 | Baker | |
| 9,782,718 B1 | 10/2017 | Baker | |
| 9,856,769 B2 | 1/2018 | Baker | |
| 9,863,314 B2 | 1/2018 | Fujita | |
| 10,060,348 B2 | 8/2018 | Ploeger | |
| 10,105,638 B2 | 10/2018 | Yeo | |
| 10,180,253 B2 | 1/2019 | Lee | |
| 10,239,015 B2 | 3/2019 | Yeo | |
| 10,245,551 B2 | 4/2019 | Baker | |
| 10,464,014 B2 | 11/2019 | Baker | |
| 10,570,793 B2 | 2/2020 | Mittricker | |
| 11,149,636 B2 | 10/2021 | Callahan | |
| 11,325,065 B2 | 5/2022 | Vaidya | |
| 11,415,053 B2 | 8/2022 | Ross | |
| 11,420,155 B2 | 8/2022 | Vaidya | |
| 11,612,855 B2 | 3/2023 | Van Der Walt | |
| 11,638,902 B2 | 5/2023 | Kolodji | |
| 11,808,206 B2 | 11/2023 | Callahan | |
| 11,813,566 B2 | 11/2023 | Baker | |
| 11,925,894 B2 | 3/2024 | Hofer | |
| 2008/0010967 A1 | 1/2008 | Griffin | |
| 2008/0011161 A1 | 1/2008 | Finkenrath | |
| 2008/0127632 A1 | 6/2008 | Finkenrath | |
| 2009/0317315 A1 | 12/2009 | Hustad | |
| 2010/0126180 A1 | 5/2010 | Forsyth | |
| 2010/0147148 A1 | 6/2010 | Rabiei | |
| 2010/0275777 A1 | 11/2010 | Hasse | |
| 2010/0300114 A1 | 12/2010 | Mhadeshwar | |
| 2011/0260112 A1 | 10/2011 | Wijmans | |
| 2011/0265445 A1 | 11/2011 | Botero | |
| 2012/0000355 A1* | 1/2012 | Sharma | B01D 53/226 |
| | | | 95/12 |
| 2012/0055385 A1 | 3/2012 | Lien | |
| 2012/0102964 A1 | 5/2012 | Nandagopal | |
| 2013/0058853 A1 | 3/2013 | Baker | |
| 2013/0125525 A1 | 5/2013 | Hein | |
| 2014/0020557 A1* | 1/2014 | Zhou | B01D 53/229 |
| | | | 96/4 |
| 2016/0090910 A1* | 3/2016 | Ploeger | F23R 3/36 |
| | | | 60/39.465 |
| 2016/0256818 A1 | 9/2016 | Gerber | |
| 2019/0217248 A1 | 7/2019 | Giraldo | |
| 2020/0078729 A1 | 3/2020 | Huang | |
| 2021/0115848 A1 | 4/2021 | Callahan | |
| 2021/0354078 A1* | 11/2021 | Baker | B01D 53/002 |
| 2022/0152552 A1 | 5/2022 | Bigeard | |
| 2022/0163686 A1 | 5/2022 | Zhao | |
| 2022/0168686 A1* | 6/2022 | Chinn | C10G 11/182 |
| 2022/0387928 A1 | 12/2022 | Chang | |
| 2023/0160634 A1 | 5/2023 | Karode | |
| 2023/0302403 A1 | 9/2023 | Ihara | |
| 2024/0115988 A1 | 4/2024 | Maeng | |
| 2024/0117285 A1 | 4/2024 | Kulkarni | |
| 2024/0131470 A1 | 4/2024 | Pere | |

OTHER PUBLICATIONS

G. Wiciak et al., "Determination of the effectiveness of commercial polymeric membranes for carbon dioxide separation," Desalination and Water Treatment, V. 243, 2021, ISSN 1944-3986, pp. 107-115, https://doi.org/10.5004/dwt.2021.27874.

Giusppe Russo et al., "Selective-exhaust gas recirculation for CO2 capture using membrane technology," Journal of Membrane Science, vol. 549, 2018, pp. 649-659, ISSN 0376-7388, https://doi.org/10.1016/j.memsci.2017.10.052.

J.P. Van Der Sluijs et al., "Feasibility of polymer membranes for carbon dioxide recovery from flue gases," Energy Conversion and Management, V. 33, Issues 5-8, 1992, pp. 429-436, ISSN 0196-8904, https://doi.org/10.1016/0196-8904(92)90040-4.

PCT International Search Report and Written Opinion mailed on Aug. 23, 2024, issued in International Application No. PCT/US2024/025726, filed on Apr. 22, 2024, 13 pages.

* cited by examiner

MEMBRANE PRECONCENTRATION OF CARBON DIOXIDE FROM EXHAUST GAS SOURCES

FIELD

The present disclosure relates to systems and methods for membrane-based gas separation to enhance carbon dioxide ($CO_2$) capture.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In an upstream oil field, significant amounts of steam are needed and injected in the ground for enhanced oil recovery operations. In co-generation plants, natural gas is burned as a fuel to generate the steam in a steam generator. In some of these co-generation plants, exhaust flue gases from gas turbine engines containing about 3 to 4 vol. % $CO_2$ are the primary source of $CO_2$ emissions. Such $CO_2$ levels are often considered to be a relatively low $CO_2$ concentration for an exhaust gas. Other low $CO_2$ concentration exhaust gases (e.g., less than 8 vol. % $CO_2$) may be observed from combined cycle gas turbines (CCGT), ship-based power generators (e.g., running on fuels such as liquified natural gas or diesel fuel), or natural gas combined-cycle (NGCC) sources to name a few.

To reduce the overall $CO_2$ emissions from these types of plants, the flue gas $CO_2$ has to be captured and reused/sequestered for other purposes. One method practiced for $CO_2$ capture is the use of amine absorption using solvents like monoethanolamine (MEA). In one example process, the flue gas is first cooled to a suitable temperature such as 50° C., and then compressed in a blower to overcome the pressure drop from the downstream equipment. The flue gas then goes through an amine plant, which has an amine absorber for removing the $CO_2$ and an amine regenerator for recovering the $CO_2$ from the solvent. In this process, both power and steam are needed to circulate and regenerate the solvent. One of the disadvantages of the amine process for low $CO_2$ exhaust gas capture is the steam requirement, and associated costs are significantly large compared to other, higher $CO_2$ exhaust sources. In addition, high steam consumption leads to high operating costs and in turn high indirect $CO_2$ emissions from burning fuel. With low $CO_2$ concentrations in the flue gas, gas-processing equipment in the amine plant are also larger due to the high volumetric flow.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with an embodiment, a process of preconcentrating $CO_2$ in an exhaust gas stream includes flowing all the exhaust gas stream from an exhaust gas source to a $CO_2$ preconcentration system, and within the $CO_2$ preconcentration system, feeding at least a portion of the exhaust gas stream to a membrane separation module comprising a polymeric membrane that has a perm-selectivity for $CO_2$ over $N_2$ and $O_2$, to produce a $CO_2$ rich exhaust gas at a permeate side of the membrane separation module and a $CO_2$ lean gas at a retentate side of the membrane separation module. The exhaust gas stream has a $CO_2$ concentration as low as 400 ppm $CO_2$, and the $CO_2$ rich exhaust gas has a $CO_2$ concentration of up to 20 vol. % $CO_2$.

In accordance with another embodiment, a $CO_2$ preconcentration system includes a flow path configured to receive a $CO_2$ source stream having a $CO_2$ concentration of less than 8 vol. %; a membrane separation module disposed along the flow path and configured to receive at least some of the $CO_2$ source stream. The membrane separation module includes a polymeric membrane that has a perm-selectivity for $CO_2$ over $N_2$ and $O_2$. The system also includes a vacuum connected to the permeate side of the membrane separation module, and which is configured to create a pressure difference across the polymeric membrane and thereby encourage gas permeance across the polymeric membrane to produce a retentate stream and a permeate stream. The permeate stream has a higher $CO_2$ concentration than the $CO_2$ source stream. The system further includes a preconcentrated stream flow path configured to flow the permeate stream to a system configured to utilize, store, or further concentrate the $CO_2$ in the permeate stream.

BRIEF DESCRIPTION OF THE DRAWINGS

Various embodiments of the present disclosure, together with further objects and advantages, may best be understood by reference to the following description taken in conjunction with the accompanying drawings, wherein.

DETAILED DESCRIPTION

The terms exhaust gas, exhaust flue gas, and flue gas are used interchangeably herein. As set forth above, there may be inefficiencies in capturing $CO_2$ from a low $CO_2$ concentration flue gas using amine-based systems. A different approach that can be utilized for low $CO_2$ concentration flue gases (e.g., less than 8 vol. % $CO_2$) is to pre-concentrate the $CO_2$ in the flue gas (or other source gas) before it goes to the amine-based processes (or other process) for final $CO_2$ capture-thereby reducing the energy/cost load. Concentrating the $CO_2$ also reduces the volumetric flow of flue gas, which permits the use of smaller or less gas processing equipment overall compared to a process with no preconcentration. One example is a reduction in the number of absorption trains or columns thereby reducing both footprint and system cost. It may also be preferable that the pre-concentration step doesn't require additional steam or result in significant process inefficiencies or increase in other emissions.

Figure 1:
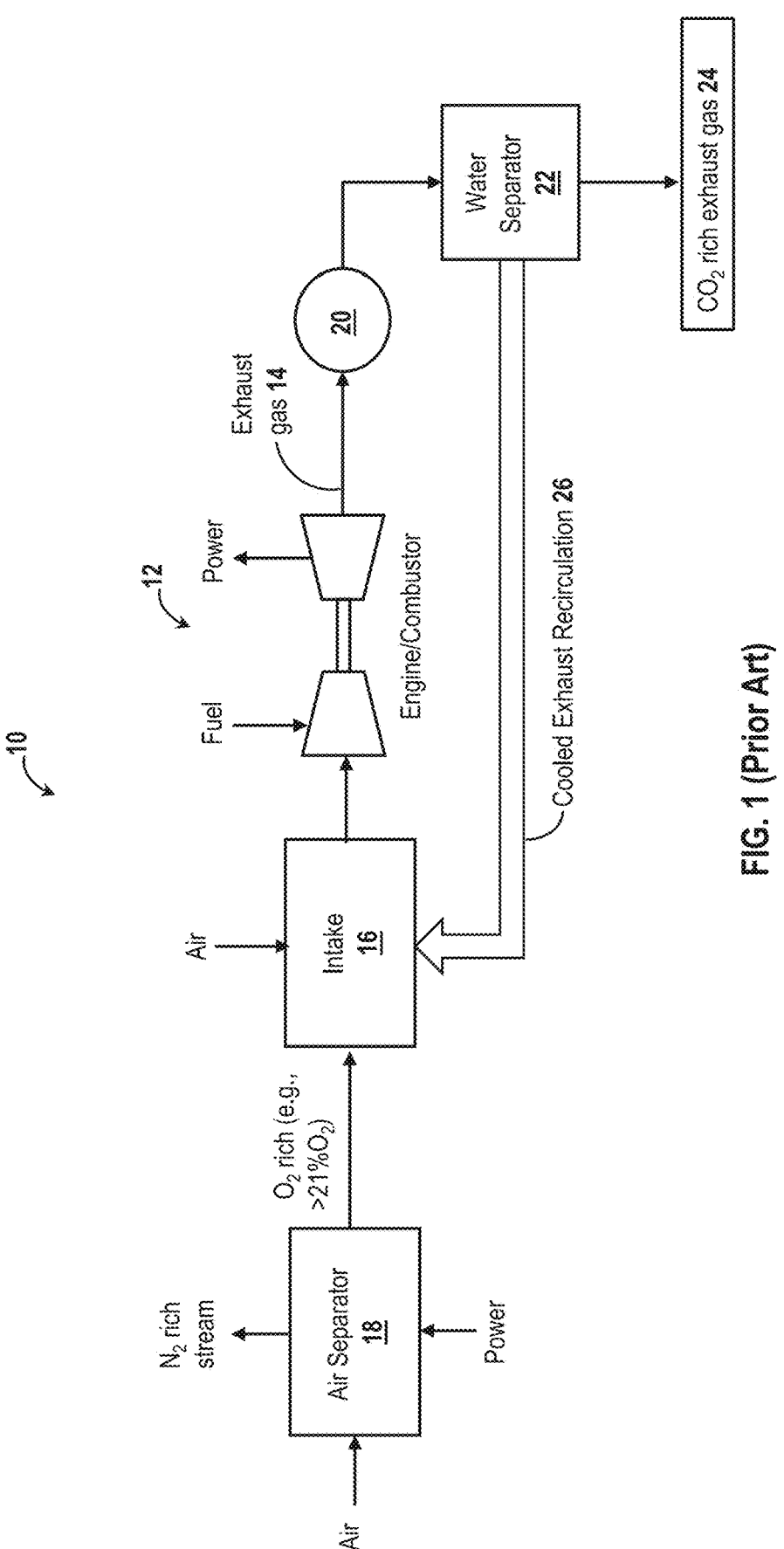
FIG. 1 is an example of an existing exhaust gas recirculation (EGR) system.

An existing approach for pre-concentration of $CO_2$ is the use of exhaust gas recycle (EGR) or semi closed cycle system process as shown in FIG. 1, which depicts an example embodiment of an EGR system 10. Starting in the middle of FIG. 1, an engine/combustor system 12 generates power and exhaust gas 14 via fuel combustion. From a process perspective, the exhaust gas 14 is generally recycled back to the engine/combustor system 12 via an intake 16.

While the EGR process does produce a $CO_2$-rich exhaust gas which may be further treated, the EGR process does have certain limitations. For example, the EGR process results in a reduced oxygen level in the engine gas combustor. With the decrease in the oxygen level (due to the recycle gas) the engine combustion efficiency can drop and could also have potential for an increase in other emissions (e.g., an increase in carbon monoxide (CO)). One way the EGR process handles the reduction in $O_2$ is by adding an air separator 18 upstream of the combustor, as shown at the very left of FIG. 1, to increase the level of $O_2$ in the combustor. The air separator requires significant power due to the presence of one or more compressors, in addition to its capital and operating expense.

Another limitation of the EGR process is that the water associated with the cooled exhaust gas is also recycled back to the combustor, which can negatively impact the engine efficiency. One way to mitigate the presence of water is by adding a cooler (before recycling) again adding cost and further complexity. In FIG. 1, the exhaust gas generated at the combustor is transmitted to a cooler 20 and to a water separation unit 22, which generates a $CO_2$-rich exhaust gas 24 (e.g., having greater than 8% by volume $CO_2$) and a $CO_2$-lean exhaust gas 26. The $CO_2$-lean exhaust gas is recirculated to the intake 16 as shown.

To address these and other shortcomings of existing approaches, the present disclosure is directed to the use of $CO_2$-selective membrane systems for pre-concentrating the low-$CO_2$ exhaust flue gas to an intermediate $CO_2$ level that is useful for other concentration, storage, or utilization processes. The term "$CO_2$-selective" for a membrane means that the membranes used in such systems (or modules) have a higher permeability for $CO_2$ relative to other gases, such as oxygen and nitrogen. The higher permeability for one gas over another may also be referred to as perm-selectivity. The membranes are polymeric and are typically made of glassy or rubbery polymers. Such membranes and their construction for use in membrane modules are well-known. As an example, the $CO_2/N_2$ selectivity of the membranes used in accordance with this disclosure may be at least 10, such as between 10 and 100.

Advantageously, membrane-based separation systems are capable of operating in a continuous mode and don't require steam or any regeneration step. While there have been examples of using membranes for flue-gas $CO_2$ capture (e.g., via multiple membrane stages and/or from a high $CO_2$ exhaust gas source), the present embodiments only use membranes for pre-concentrating $CO_2$ for low concentration $CO_2$ exhaust sources. In accordance with this disclosure, low $CO_2$ concentration exhaust sources may have a $CO_2$ concentration up to 8 vol. % $CO_2$, but generally not higher than 8 vol. %.

Indeed, it is now recognized that membrane-based separation systems (e.g., membrane modules, which may be alternatively referenced as membrane separation modules) have the advantage of being modular and can be applied to a variety of flue gas sources, where membrane systems can take streams with $CO_2$ levels from as low as 400 ppm $CO_2$ and produce enriched streams to up to 8-10% by volume $CO_2$ for potential other capture routes or applied to $CO_2$ utilization routes. Another example is using such membrane-based separation systems for enriching streams having a moderately low $CO_2$ level (e.g., 8-10 vol. %) to greater than 15 vol. % for other capture methods (e.g., between 15 and 30 vol. %, such as between 16 and 20 vol. %) which typically require such a minimum concentration to operate efficiently. In this way, membrane-based separation systems may also be used in several hybrid configurations to make certain $CO_2$ capture processes more efficient and economical overall. Thus, the present disclosure includes using a pre-concentration system having a membrane separation module to preconcentrate the $CO_2$ within an exhaust gas having a first $CO_2$ concentration to produce a preconcentrated exhaust gas having a second $CO_2$ concentration that is higher than the first $CO_2$ concentration. In some embodiments, the second $CO_2$ concentration is a concentration corresponding to the exhaust gas $CO_2$ concentration at which another type of $CO_2$ treatment process may be optimal or otherwise particularly suited. The membrane-based preconcentration systems of this disclosure may produce preconcentrated streams having at least a 1.25-fold higher $CO_2$ concentration than the input stream. By way of example, the preconcentration system may produce preconcentrated streams having a $CO_2$ concentration that is between 1.25 and 20 times higher than the input stream, such as between 1.5 and 10 times higher, between 1.75 and 6 times higher, or between 2 and 4 times higher than the input stream.

Figure 2:
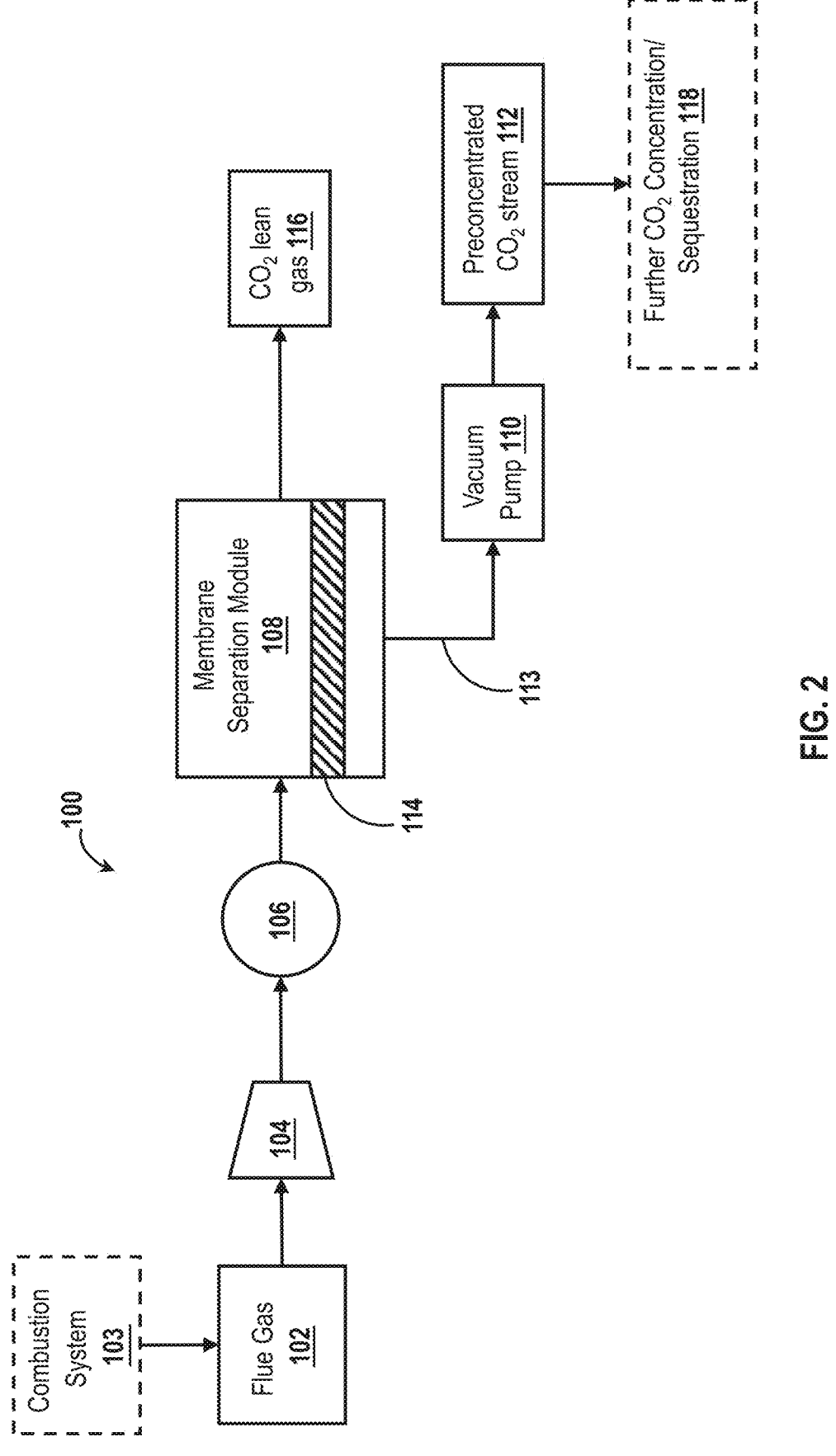
FIG. 2 is an example of a preconcentration system utilizing a membrane module to preconcentrate $CO_2$ from an exhaust gas having 3 vol. % $CO_2$ to produce a preconcentrated exhaust gas having greater than 8 vol. % $CO_2$, in accordance with an embodiment of this disclosure.
Figure 3:
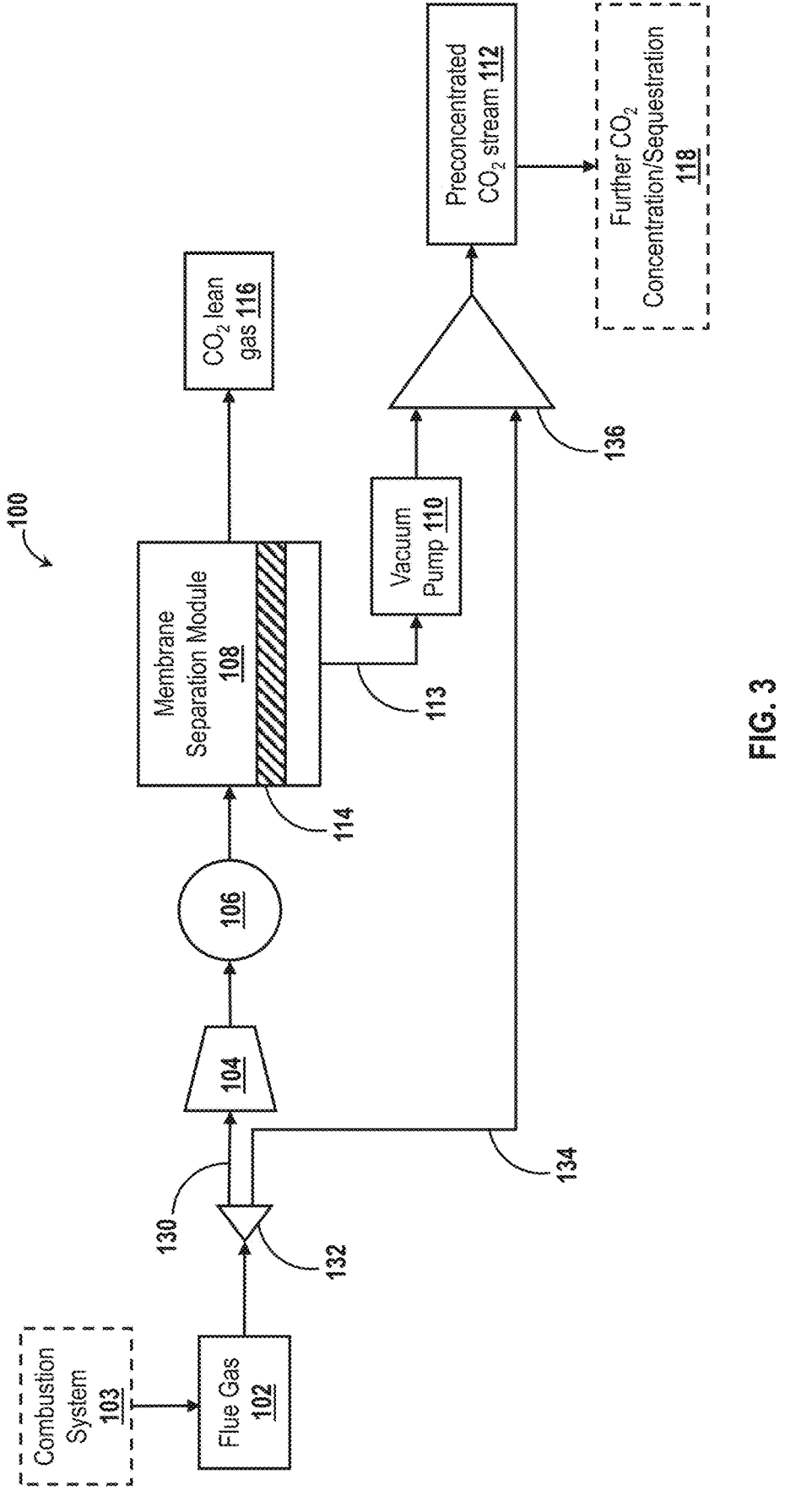
FIG. 3 is another example embodiment of a preconcentration system utilizing a membrane module to preconcentrate $CO_2$ from an exhaust gas having 3 vol. % $CO_2$ to produce a preconcentrated exhaust gas having greater than 8 vol. % $CO_2$, in accordance with an embodiment of this disclosure.

FIGS. 2 and 3 illustrate an example of a membrane preconcentration system 100. Referring now to FIG. 2, the system 100 includes an exhaust gas flow path that receives a flue gas 102—in particular a low $CO_2$ concentration exhaust gas, which in the illustrated embodiment corresponds to, by way of non-limiting example, about 3 vol. % $CO_2$ (e.g., a first concentration). As noted above, such flue gas streams may be generated by certain combustion systems 103 such as in a co-generation plant, combined cycle gas turbines (CCGT), ship-based power generators (e.g., running on LNG), or natural gas combined-cycle (NGCC) sources. These sources may produce other concentrations in some embodiments. For example, the flue gas 102 may have less than 8 vol. % $CO_2$, such as between 0.5 vol. % $CO_2$ and 8 vol. % $CO_2$, between 1 vol. % $CO_2$ and 6 vol. % $CO_2$, or between 2 vol. % $CO_2$ and 4 vol. % $CO_2$.

The preconcentration system 100 may receive all the exhaust gas generated by the combustion system 103, along the exhaust gas flow path. As described below with respect to FIGS. 2, 3, 6, and 7, various features are positioned along the exhaust gas flow path to treat the exhaust gas.

The system 100 of FIG. 2 includes various features disposed along the exhaust gas flow path, including a blower or compressor 104 to provide a sufficient pressure driving force for the flue gas 102 through at least a cooler 106 disposed along the exhaust gas flow path of the system 100. The flue gas 102 from the combustion system 103 may be too hot to be treated directly by a membrane module 108, and accordingly the flue gas 102 may be cooled in the cooler 106 to a temperature between, by way of non-limiting example, 25° C. and 80° C. The cooled flue gas is then sent to the feed side of a membrane module 108 for $CO_2$ separation. The membrane separation module 108 is also disposed along the exhaust gas flow path of the preconcentration system 100. Membrane separation is driven by a vacuum 110 on the downstream or permeate side which produces a $CO_2$ rich gas or preconcentrated $CO_2$ stream 112 (corresponding to a permeate stream 113, in this embodiment) having greater than 8 vol. % $CO_2$, which may be referred to as a preconcentrated $CO_2$ stream. By way of non-limiting example, the preconcentrated $CO_2$ stream 112 may have between 8 vol. % $CO_2$ and 20 vol. % $CO_2$, such as between 10 vol. % $CO_2$ and 18 vol. % $CO_2$, or between 12 vol. % $CO_2$ and 16 vol. % $CO_2$.

The membrane separation module 108, as depicted, includes one or more $CO_2$-selective membranes 114 that allow selective permeation of $CO_2$ over oxygen ($O_2$) and nitrogen ($N_2$). In this way, the stream exiting the permeate side of the module 108 is a $CO_2$-enriched stream (i.e., the $CO_2$ rich gas, a preconcentrated stream 112), while the stream exiting the retentate side of the module 108 is a $CO_2$-depleted stream (i.e., a $CO_2$ lean gas 116). Generally, it is preferred in accordance with present embodiments to create a pressure difference between the permeate and retentate side of the membrane 114 using the vacuum 110, as the amount of $CO_2$ enrichment possible when the feed is at a relatively low starting $CO_2$ concentration (e.g., less than 8 vol. % $CO_2$) has been found to be higher using this technique when compared to most sweep gas configurations. However, it is also within the scope of this disclosure for certain another membrane-based separation system, a $CO_2$ injection system, a system that converts $CO_2$ into another chemical, or any combination of these. The preconcentration system 100 may include a preconcentrated stream flow path fluidly connecting the permeate side of the membrane separation module 108 with the system 118. In accordance with present embodiments, the system 118 is not an exhaust gas recirculation/recycle (EGR) system. In other words, the permeate stream 113 is not sent, either alone or in combination with other streams, as a recycle stream to a gas turbine engine.

The embodiment of the preconcentration system 100 illustrated in FIG. 3 works on the same principle as the system 100 of FIG. 2 in terms of treatment of the flue gas 102. The system 100 of FIG. 3, instead of treating the entire flue gas stream, treats a first partial stream 130 generated by a gas split 132 positioned upstream of the membrane separation module 108 and along the exhaust gas flow path. In this embodiment, the gas split 132 is positioned upstream of the blower or compressor 104 and the cooler 106. However, the gas split 132 may be positioned at any point upstream of the membrane separation module 108, such as between the blower or compressor 104 and the membrane separation module 108.

The first partial stream 130 of the flue gas 102 is transmitted through the blower or compressor 104, while a second partial stream 134 of the flue gas 102 is transmitted directly to a gas combiner 136. The gas combiner 136 combines the permeate stream 113 from the membrane module 108 with the second portion 134 of the flue gas 102 to produce the preconcentrated $CO_2$ stream 112.

The difference in using the preconcentration system 100 of FIG. 2 or 3 depends primarily on which type of membrane is chosen for the separation and its separation properties. Separation properties of the membrane 114 may include gas permeance and selectivity. Table 1 illustrates examples of two different membranes and the resultant impact on the $CO_2$ purity. In this particular example, in accordance with the system 100 in FIG. 3, 80% of the flue gas volume is transmitted through the membrane module 108 while 20% of the flue gas bypasses the membrane module 108. In other words, 80% of the flue gas 102 is the first portion 130 while 20% is the second portion 134 in the example of Table 1.

The 80% thus undergoes preconcentration (producing the permeate stream 113) and is recombined with the untreated flue gas (stream 130) to produce the $CO_2$ rich exhaust gas 112 as shown in FIG. 3. This is referred to as the "combined $CO_2$ rich exhaust gas" in Table 1.

TABLE 1

| | CO₂ recovery as a function of membrane parameters | | | | |
|---|---|---|---|---|---|
| | CO₂ Permeance (GPU) | CO₂/N₂ Selectivity | Ratio of flow to Membrane | Combined CO₂ rich exhaust gas (mol % CO₂) | CO₂ Recovery % |
| Membrane 1 | 2000 | 25 | 0.8 | 8.1 | 82 |
| Membrane 2 | 2500 | 100 | 0.8 | 9.1 | 80 | embodiments to use a sweep gas either in lieu of or in addition to the vacuum pump 110 to encourage $CO_2$ permeance through the polymeric membrane 114 (which is intended to represent one or more membranes).

The $CO_2$ rich stream (preconcentrated stream 112) produced by the system 100, which is a preconcentrated stream, may be delivered to another system 118 for further concentration, sequestration, or further use. By way of non-limiting example the system 118 may be an amine-based system, As shown in Table 1, the two example membranes differ in their $CO_2$ permeance and $CO_2/N_2$ selectivity. That is, the first membrane is 25 times more selective for $CO_2$ relative to nitrogen ($N_2$), while the second membrane is 100 times more selective. The first membrane has a lower permeance relative to the second membrane. The combined $CO_2$ rich exhaust gas generated by the second membrane has a higher purity compared to the first membrane (9.1 mol % $CO_2$ compared to 8.1 mol % $CO_2$). Thus, higher $CO_2$ permeance and higher $CO_2$ selectivity results in a higher purity combined $CO_2$ rich exhaust gas, with the tradeoff that the first membrane (lower $CO_2$ permeance and lower $CO_2$ selectivity) results in a greater amount of $CO_2$ recovery (82% vs 80%). It was also found that the second membrane having higher permeance and selectivity resulted in a lower overall power requirement compared to the first membrane.

Figure 4:
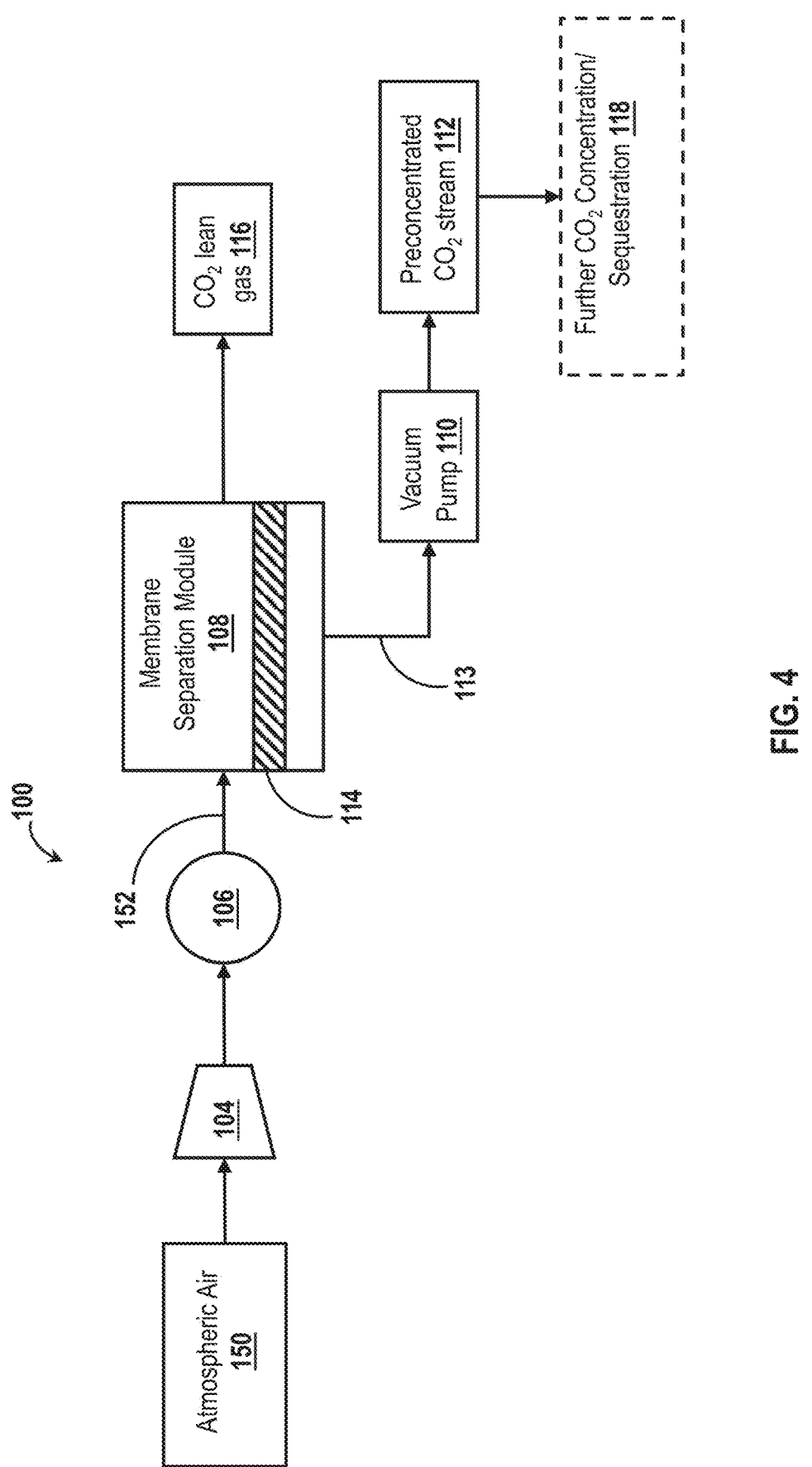
FIG. 4 is an example embodiment of a preconcentration system utilizing a membrane module to preconcentrate $CO_2$ from atmospheric air having about 400 ppm $CO_2$ to produce a preconcentrated gas having about 8 to 20 vol. % $CO_2$, in accordance with an embodiment of this disclosure.

FIGS. 4-7 illustrate several example embodiments of the $CO_2$ preconcentration system 100 using membranes to enrich the $CO_2$ from other sources of $CO_2$ to produce the preconcentrated $CO_2$ stream 112. As shown in FIG. 4, the embodiment of the preconcentration system 100 intakes atmospheric air 150, which has approximately 400 ppm $CO_2$, and transmits it through the blower or compressor 104, cools it in cooler 106 (which may be optional depending on the output temperature of the compressed/pressurized air), and sends a resulting compressed air stream 152 through the membrane separation module 108. The membrane separation module 108 outputs the $CO_2$ lean gas stream 116 (i.e., the retentate stream) and a $CO_2$ rich gas as the permeate stream 113, which corresponds to the preconcentrated $CO_2$ stream 112 in this embodiment. The $CO_2$ rich gas may have between 8 and 20 vol. % $CO_2$ as described above, and may be sent for further treatment (e.g., further concentration), storage, or utilization 118.

Figure 5:
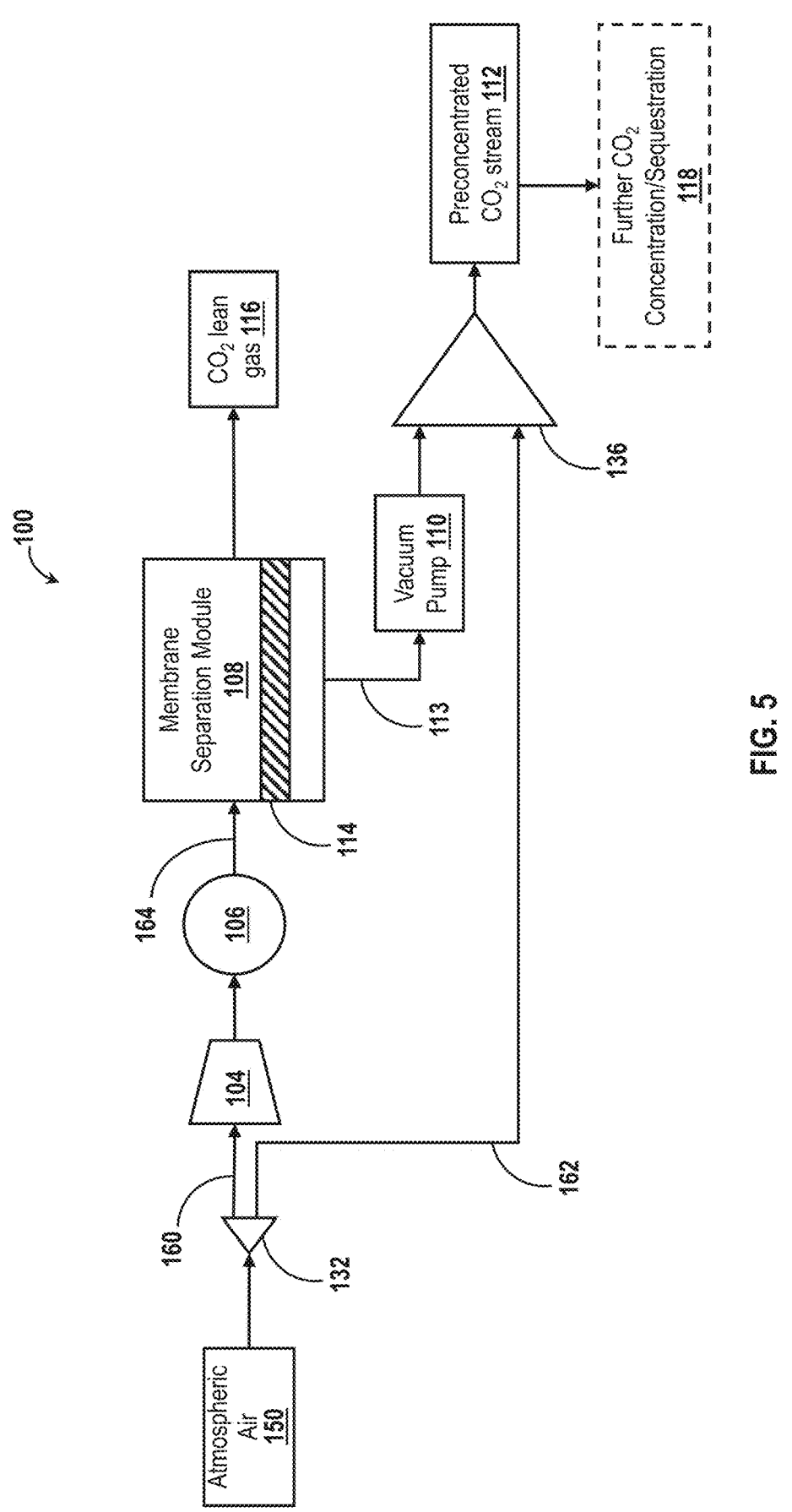
FIG. 5 is an example embodiment of a preconcentration system utilizing a membrane module to preconcentrate $CO_2$ from atmospheric air having about 400 ppm $CO_2$ to produce a preconcentrated gas having about 8 to 20 vol. % $CO_2$, in accordance with an embodiment of this disclosure.

The preconcentration system 100 of FIG. 5 operates in a similar manner as described above with respect to FIG. 3, but intakes atmospheric air 150 as described with respect to FIG. 4. The system 100 thus outputs a $CO_2$ lean gas having less than 400 ppm $CO_2$ and a $CO_2$ rich gas having between 8 and 20 vol. % $CO_2$, which may be sent for further treatment (e.g., further concentration), storage, or utilization.

More specifically, as with the system of FIG. 3, the gas split 132 of the system 100 of FIG. 5 splits the atmospheric air 150 into a first partial stream 160 and a second partial stream 162. The first partial stream 160 is compressed and cooled to produce air stream 164, which is provided to the feed side of the membrane separation module 108 to produce the $CO_2$ lean gas 116 and the permeate stream 113. The gas combiner 136 combines the second partial stream 162 and the permeate stream 113 to generate the preconcentrated $CO_2$ stream 112 having the $CO_2$ concentrations noted above. The preconcentrated $CO_2$ stream 112 may then be sent for further $CO_2$ concentration or sequestration 118.

Figure 6:
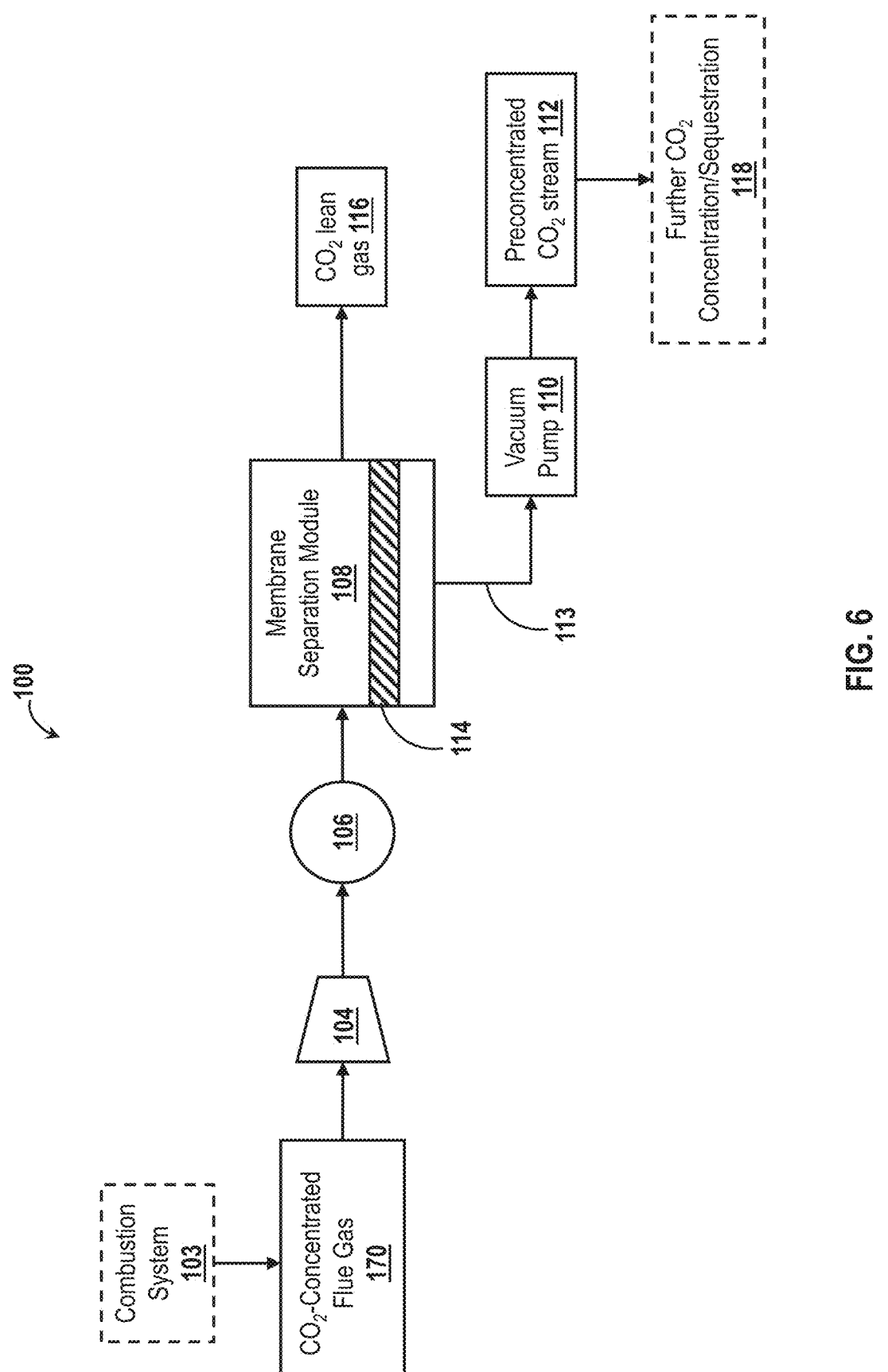
FIG. 6 is an example embodiment of a preconcentration system utilizing a membrane module to preconcentrate $CO_2$ from an exhaust gas having about 8-10 vol. % $CO_2$, in accordance with an embodiment of this disclosure.
Figure 7:
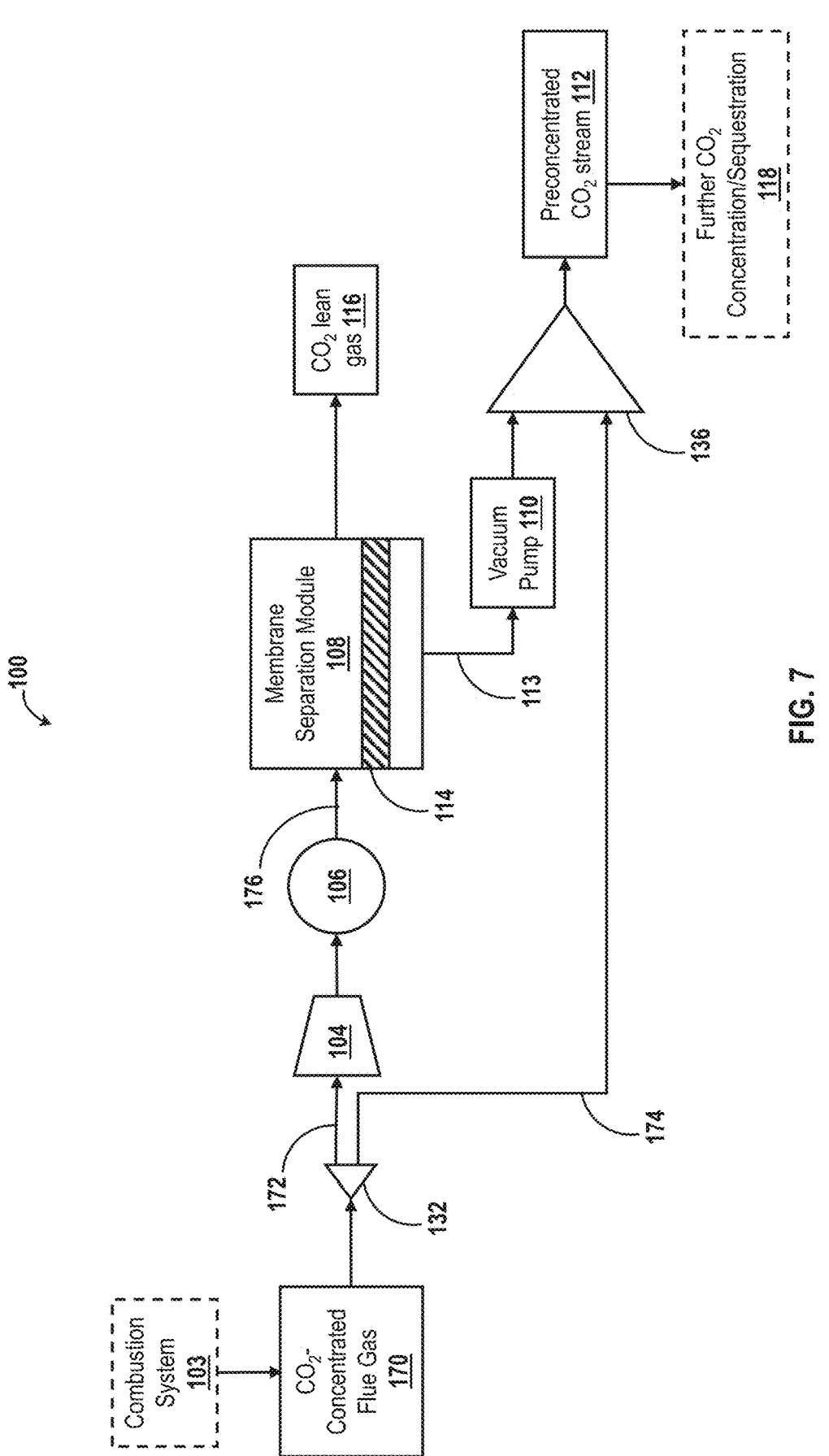
FIG. 7 is an example embodiment of a preconcentration system utilizing a membrane module to preconcentrate $CO_2$ from an exhaust gas having 3 vol. % $CO_2$, in accordance with an embodiment of this disclosure.

FIGS. 6 and 7 are embodiments of the system 100 that operate similar to those described above with respect to FIGS. 2 and 3, respectively, but where the preconcentration system 100 intakes a flue gas 170 with a moderate $CO_2$ concentration (e.g., between 8 vol. % $CO_2$ and 10 vol. % $CO_2$) along the exhaust gas flow path. Examples of flue gases having such a $CO_2$ concentration may include exhaust gases from natural gas fire heater boilers or steam boilers. In this way, the combustion system 103 may represent a natural gas fire heater boiler or steam boiler, or the like.

In the preconcentration system 100 of FIG. 6, the $CO_2$-concentrated flue gas 170 is compressed and cooled and is provided to the feed side of the membrane separation module 108. The permeate stream 113 has a higher $CO_2$ concentration than the $CO_2$-concentrated flue gas 170. By way of non-limiting example, the preconcentrated $CO_2$ stream 112 of FIG. 6 may have a $CO_2$ concentration of greater than 16 vol. % $CO_2$, such as between 16 vol. % $CO_2$ and 30 vol. % $CO_2$. The retentate stream, i.e., the $CO_2$ lean gas 116, has less than 8 vol. % $CO_2$. The $CO_2$ rich exhaust gas may be sent for further treatment (e.g., further concentration), storage, or utilization at 118.

The preconcentration system 100 of FIG. 7 receives the $CO_2$ concentrated flue gas 170, and gas split 132 splits the stream into a first partial stream 172 and a second partial stream 174. The first partial stream 172 is boosted/compressed and cooled to produce cooled stream 176, which is provided to the feed side of the membrane separation module 108. The second partial stream 174 is combined with the permeate stream 113 generated by the membrane separation module 108 at the gas combiner 136 to produce the preconcentrated $CO_2$ stream 112.

By way of non-limiting example, the preconcentrated $CO_2$ stream 112 of FIG. 7 may have a $CO_2$ concentration of greater than 16 vol. % $CO_2$, such as between 16 vol. % $CO_2$ and 30 vol. % $CO_2$. The retentate stream, i.e., the $CO_2$ lean gas 116, has less than 8 vol. % $CO_2$. The $CO_2$ rich exhaust gas may be sent for further treatment (e.g., further concentration), storage, or utilization at 118.

While the embodiments described with respect to FIGS. 2-7 indicate specific example input streams (flue gas, atmospheric air) and example combustion systems, the present disclosure is not necessarily limited to these specific examples unless otherwise indicated. For example, in some embodiments, the source of the flue gas used as an input stream may be an exhaust gas recirculation (EGR) system, where the EGR system performs some amount of concentration, which is then provided to the preconcentration system 100 as an input stream. In such embodiments, the preconcentration system 100 produces the preconcentrated $CO_2$ stream, which is not recycled back to the EGR system.

The specific embodiments described above have been shown by way of example, and it should be understood that these embodiments may be susceptible to various modifications and alternative forms, and can also be used in any appropriate combination. It should be further understood that the claims are not intended to be limited to the particular forms disclosed, but rather to cover all modifications, equivalents, and alternatives falling within the spirit and scope of this disclosure.

What is claimed is:

1. A process of preconcentrating $CO_2$ in an exhaust gas stream, comprising:

flowing all the exhaust gas stream from an exhaust gas source to a $CO_2$ preconcentration system; and within the $CO_2$ preconcentration system, feeding at least a portion of the exhaust gas stream to a membrane separation module comprising a polymeric membrane that has a perm-selectivity for $CO_2$ over $N_2$ and $O_2$, to produce a $CO_2$ rich exhaust gas at a permeate side of the membrane separation module and a $CO_2$ lean gas at a retentate side of the membrane separation module;

driving separation at the membrane separation module using a vacuum pump of the $CO_2$ preconcentration system on the permeate side, wherein the $CO_2$ rich exhaust gas from the permeate side is sent directly to the vacuum pump to produce a preconcentrated exhaust gas; and wherein the exhaust gas stream has a $CO_2$ concentration as low as 400 ppm $CO_2$, the $CO_2$ rich exhaust gas has a $CO_2$ concentration of up to 20 vol. % $CO_2$, and wherein the preconcentrated exhaust gas has a $CO_2$ concentration corresponding to an exhaust gas $CO_2$ concentration at which another $CO_2$ treatment system connected to the $CO_2$ preconcentration system is optimal or otherwise particularly suited.

2. The process of claim 1, wherein feeding at least a portion of the exhaust gas stream to a membrane separation module comprises feeding all the exhaust gas stream to the membrane separation module.

3. The process of claim 1, wherein feeding at least a portion of the exhaust gas stream to a membrane separation module comprises feeding a first portion of the exhaust gas stream to the membrane separation module, the first portion corresponding to less than all the exhaust gas stream flowed into the $CO_2$ preconcentration system.

4. The process of claim 3, comprising splitting the exhaust gas stream into the first portion of the exhaust gas stream and a second portion of the exhaust gas stream, and mixing the second portion of the exhaust gas stream with the $CO_2$ rich exhaust gas downstream of the membrane separation module to produce the preconcentrated exhaust gas.

5. The process of claim 1, comprising pressurizing or compressing the exhaust gas stream to produce a pressurized or compressed exhaust gas stream; and cooling the pressurized or compressed exhaust gas stream upstream of the membrane separation module.

6. The process of claim 1, wherein the exhaust gas stream is a low $CO_2$ concentration exhaust gas having between 3 and 4 vol. % $CO_2$, and the $CO_2$ rich exhaust gas has greater than 8 vol. % $CO_2$.

7. The process of claim 1, wherein the exhaust gas stream has between 8 and 10 vol. % $CO_2$, and the $CO_2$ rich exhaust gas has greater than 16 vol. % $CO_2$.

8. The process of claim 1, wherein the polymeric membrane has a 10 to 100 $CO_2/N_2$ perm-selectivity.

9. The process of claim 1, wherein the $CO_2$ preconcentration system has only one membrane separation stage.

10. The process of claim 1, wherein flowing all the exhaust gas stream from the exhaust gas source to the $CO_2$ preconcentration system comprises flowing all the exhaust gas from a gas turbine system to the $CO_2$ preconcentration system.

11. The process of claim 1, wherein flowing all the exhaust gas stream from the exhaust gas source to the $CO_2$ preconcentration system comprises flowing all the exhaust gas from a natural gas fire heater boiler or steam boiler to the $CO_2$ preconcentration system.

12. The process of claim 1, wherein the $CO_2$ rich exhaust gas at the permeate side of the membrane separation module has a $CO_2$ concentration that is between 1.25 and 20 times higher than the exhaust gas stream received by the $CO_2$ preconcentration system.

13. The process of claim 1, comprising providing the preconcentrated exhaust gas to the other $CO_2$ treatment system for further concentration of the $CO_2$ in the preconcentrated exhaust gas.

14. The process of claim 13, wherein providing the preconcentrated exhaust gas to the other $CO_2$ treatment system for further concentration of the $CO_2$ in the preconcentrated exhaust gas comprises flowing the preconcentrated exhaust gas along a preconcentrated stream flow path fluidly connecting the permeate side of the membrane separation module with the other $CO_2$ treatment system.

15. The process of claim 13, wherein the other $CO_2$ treatment system is not an exhaust gas recirculation/recycle (EGR) system.

16. The process of claim 13, wherein the preconcentrated exhaust gas is not sent, either alone or in combination with other streams, as a recycle stream to a gas turbine engine.

17. The process of claim 13, wherein the other $CO_2$ treatment system comprises an amine-based system, or a $CO_2$ injection system, or a system that converts $CO_2$ into another chemical, or a combination thereof.

* * * * *